United States Patent
Otake

(10) Patent No.: US 11,402,517 B2
(45) Date of Patent: Aug. 2, 2022

(54) RADIATION DETECTOR, RADIATION INSPECTING DEVICE, AND METHOD FOR PROCESSING RADIATION DETECTION SIGNAL

(71) Applicant: Nihon Kessho Kogaku Co., Ltd., Gunma (JP)

(72) Inventor: Makoto Otake, Gunma (JP)

(73) Assignee: Nihon Kessho Kogaku Co., Ltd., Gunma (JP)

( * ) Notice: Subject to any disclaimer, the term of this patent is extended or adjusted under 35 U.S.C. 154(b) by 20 days.

(21) Appl. No.: 17/259,358

(22) PCT Filed: Jul. 4, 2019

(86) PCT No.: PCT/JP2019/026554
§ 371 (c)(1),
(2) Date: Jan. 11, 2021

(87) PCT Pub. No.: WO2020/013062
PCT Pub. Date: Jan. 16, 2020

(65) Prior Publication Data
US 2022/0155469 A1    May 19, 2022

(30) Foreign Application Priority Data
Jul. 11, 2018    (JP) .............................. JP2018-131673

(51) Int. Cl.
*G01J 5/02*        (2022.01)
*G01T 1/20*        (2006.01)
(Continued)

(52) U.S. Cl.
CPC ........... *G01T 1/2018* (2013.01); *G01N 23/04* (2013.01); *G01N 23/06* (2013.01);
(Continued)

(58) Field of Classification Search
CPC ...... G01T 1/2018; G01N 23/04; G01N 23/06; G01N 2223/04; G01N 2223/3307; G01N 2223/401; G01N 2223/505
See application file for complete search history.

(56) References Cited

U.S. PATENT DOCUMENTS

| 5,144,141 A | 9/1992 | Rougeot et al. |
| 5,862,061 A | 1/1999 | Yamashita et al. |

(Continued)

FOREIGN PATENT DOCUMENTS

| EP | 2495585 A2 | 9/2012 |
| JP | 7-294649 A | 11/1995 |

(Continued)

OTHER PUBLICATIONS

International Search Report (ISR) dated Oct. 1, 2019 filed in PCT/JP2019/026554.

*Primary Examiner* — Kiho Kim
(74) *Attorney, Agent, or Firm* — Rankin, Hill & Clark LLP

(57) ABSTRACT

Provided is a detector capable of appropriately and highly accurately detecting radiation even under an environment where a wide range of radiation is irradiated.
The radiation detector is configured in such a manner that a plurality of light receiving devices are arranged in each cell of a scintillator that is divided into a plurality of cells, photoelectric conversion of scintillation light emitted by each individual cell is dividedly performed by the plurality of light receiving devices to reduce a charge amount of an output signal of each light receiving device, and the output signals are input into an integrated circuit to generate a radiation detection signal of each cell.

7 Claims, 6 Drawing Sheets

(51) Int. Cl.
    *G01N 23/04*        (2018.01)
    *G01N 23/06*        (2018.01)
(52) U.S. Cl.
    CPC .  *G01N 2223/04* (2013.01); *G01N 2223/3307*
            (2013.01); *G01N 2223/401* (2013.01); *G01N*
                                        *2223/505* (2013.01)

(56) References Cited

U.S. PATENT DOCUMENTS

| | | | |
|---|---|---|---|
| 9,968,323 | B2 * | 5/2018 | Yamazaki .............. A61B 6/032 |
| 10,591,618 | B2 | 3/2020 | Nishihara et al. |
| 2007/0206721 | A1 | 9/2007 | Tkaczyk et al. |
| 2012/0307025 | A1 | 12/2012 | Lerche et al. |
| 2016/0216381 | A1 | 7/2016 | Nishihara et al. |
| 2017/0212250 | A1 | 7/2017 | Jin et al. |
| 2018/0328783 | A1 | 11/2018 | Nishihara et al. |
| 2019/0094391 | A1 | 3/2019 | Nishihara et al. |
| 2020/0200923 | A1 | 6/2020 | Nishihara et al. |

FOREIGN PATENT DOCUMENTS

| | | |
|---|---|---|
| JP | 11-142523 A | 5/1999 |
| JP | 2005-331458 A | 12/2005 |
| JP | 2009-18154 A | 1/2009 |
| JP | 2014-12109 A | 1/2014 |
| JP | 2014-139564 A | 7/2014 |
| JP | 2014-168602 A | 9/2014 |
| WO | 2017/086181 A1 | 5/2017 |
| WO | 2017/183481 A1 | 10/2017 |
| WO | 2019/021819 A1 | 1/2019 |

\* cited by examiner

[FIG. 1]
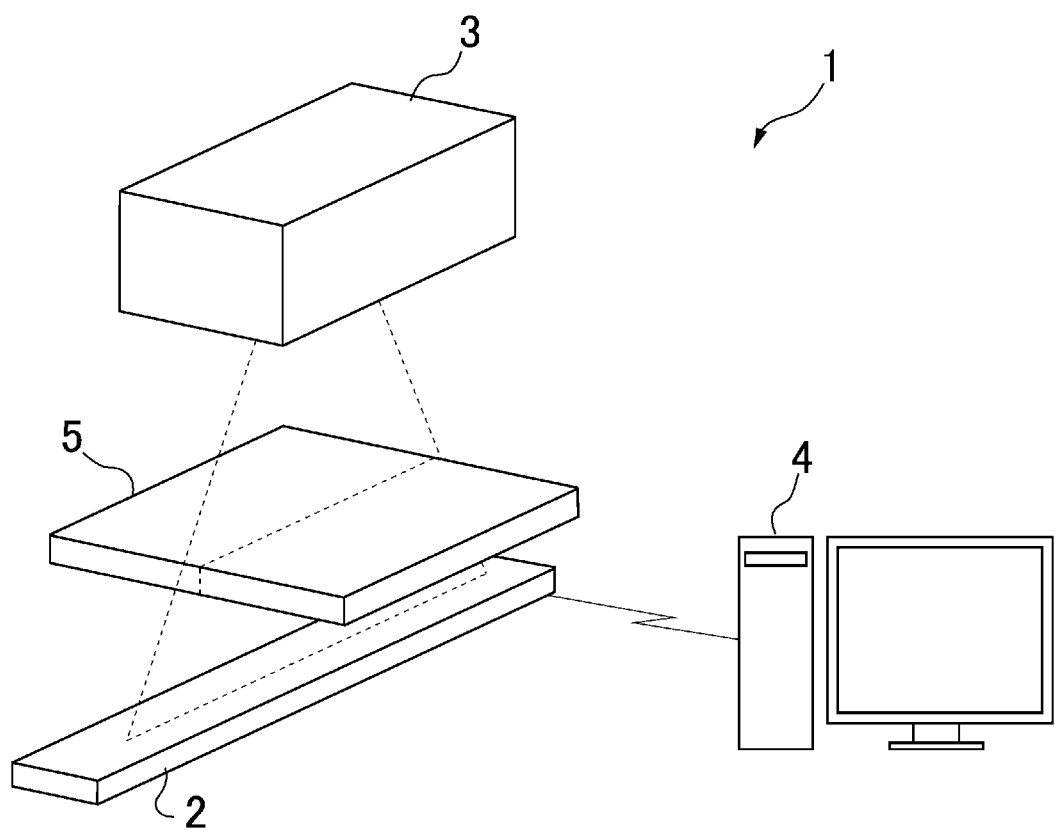

[FIG. 2]
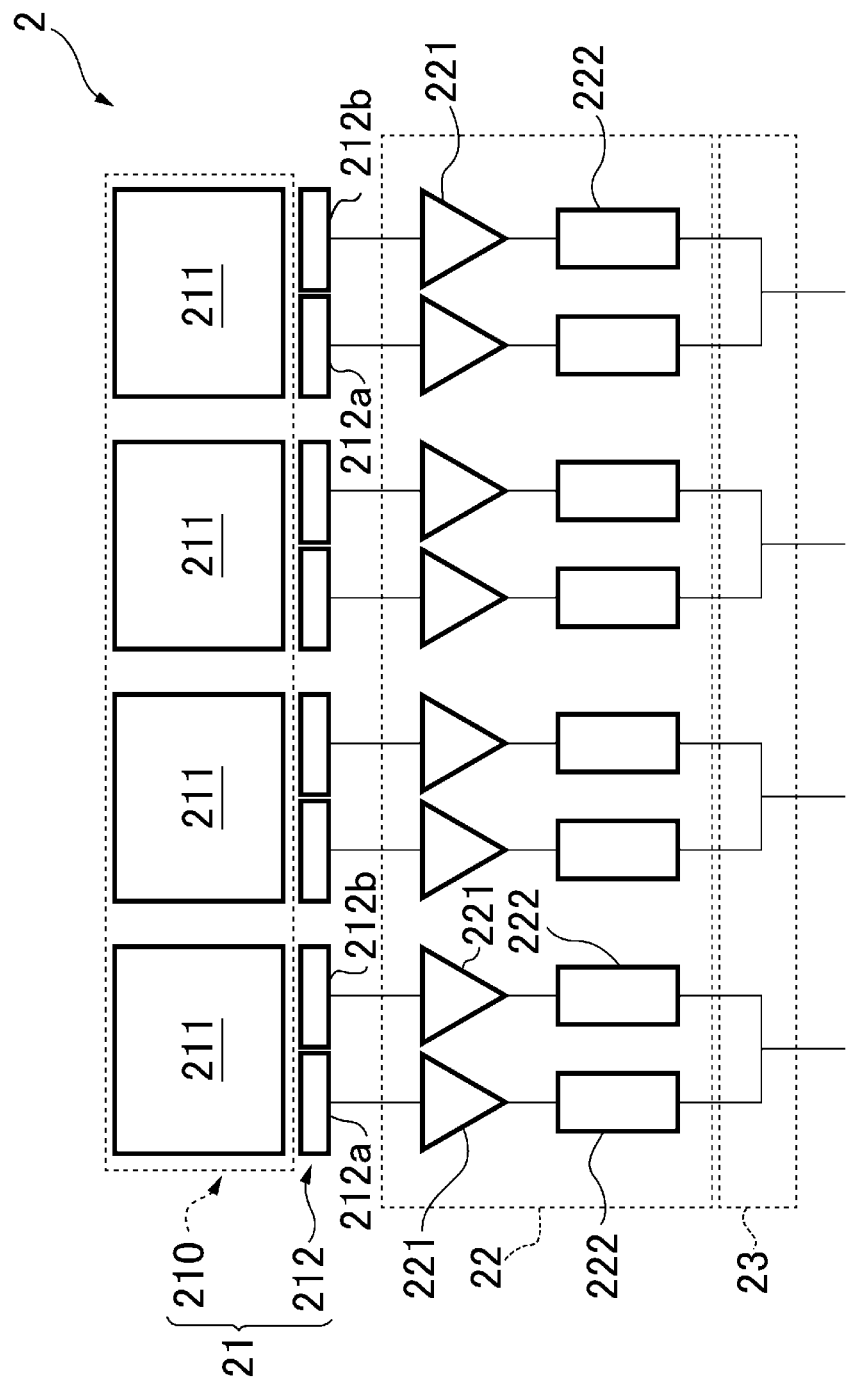

[FIG. 3]
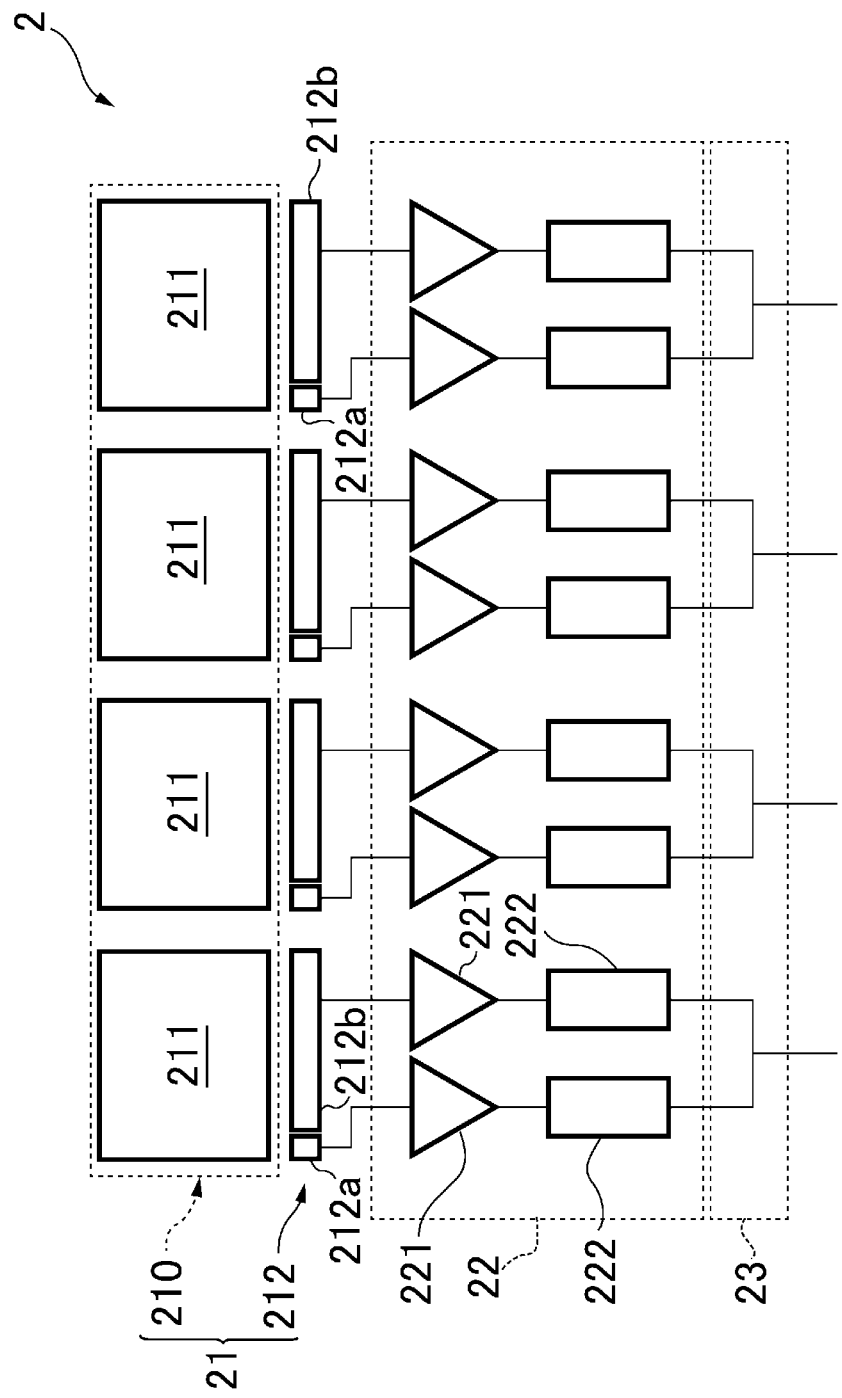

[FIG. 4]
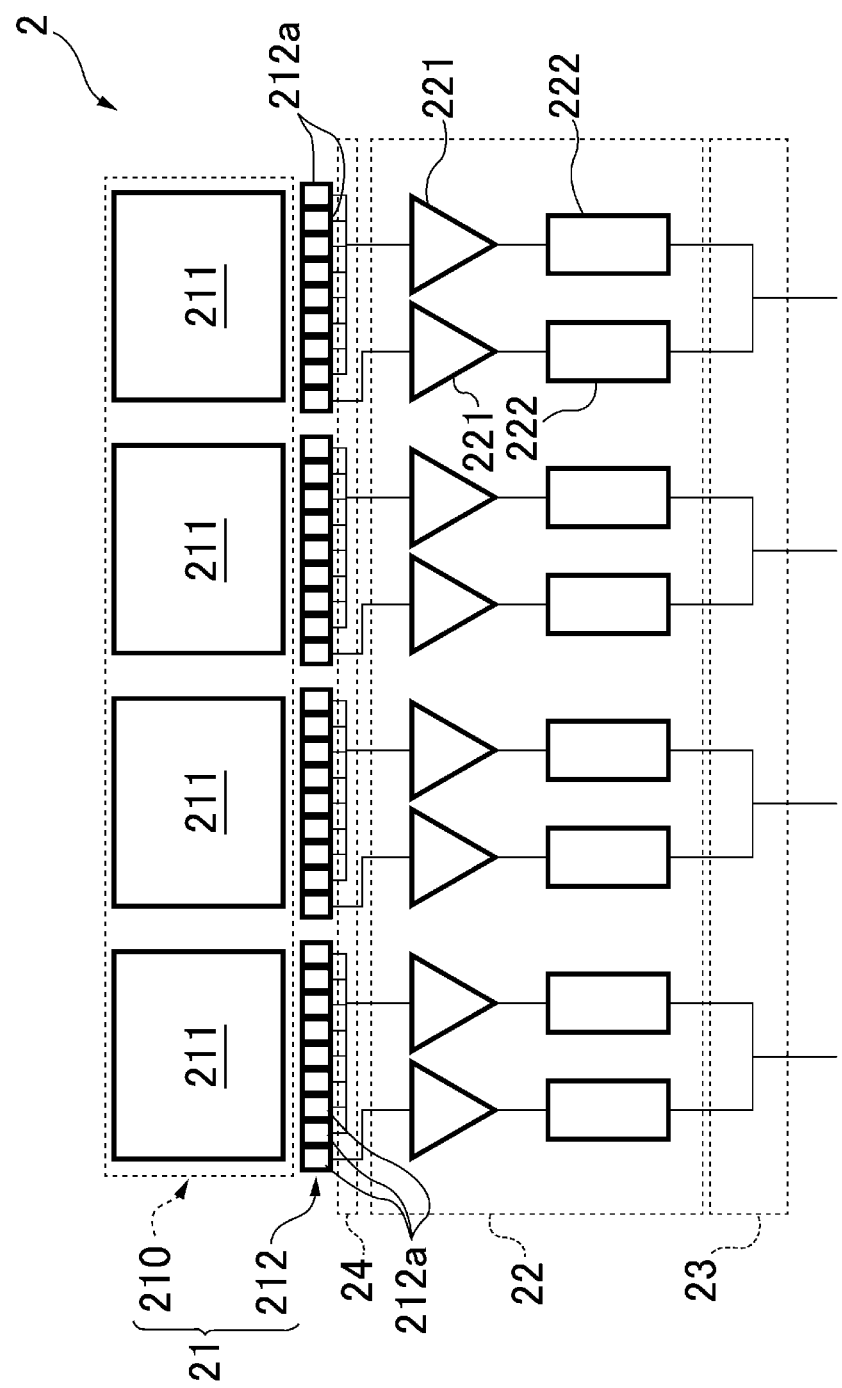

[FIG. 5]
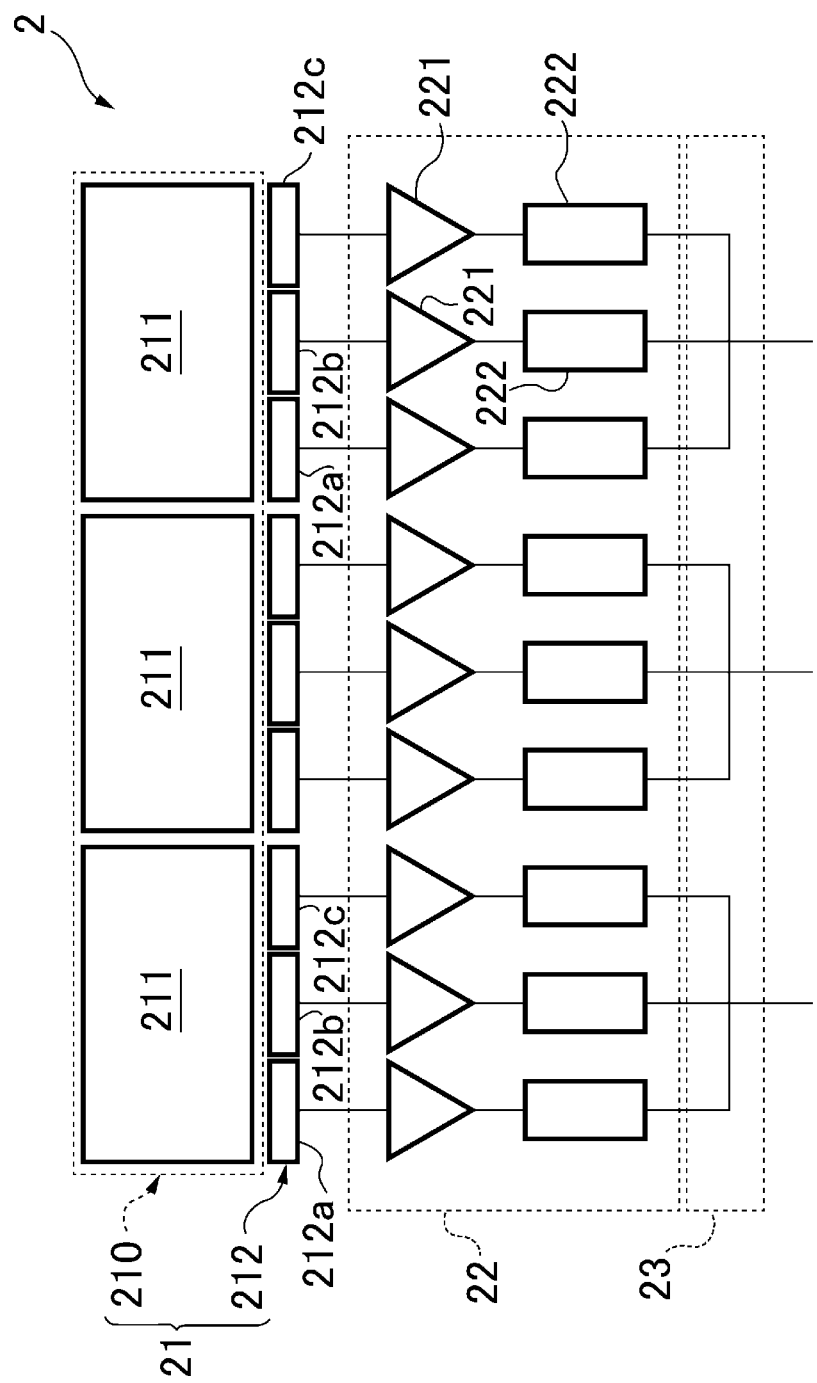

[FIG. 6]
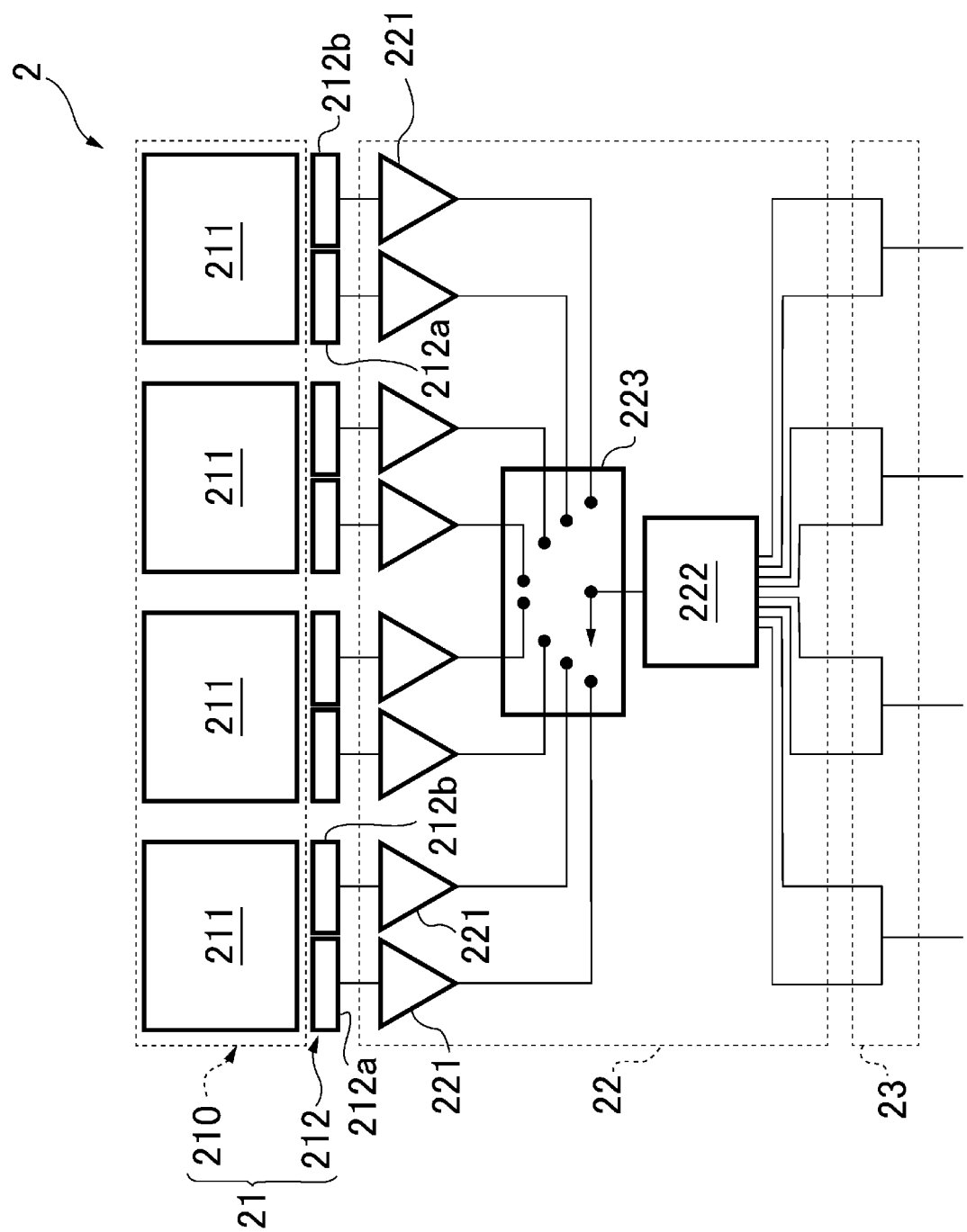

RADIATION DETECTOR, RADIATION INSPECTING DEVICE, AND METHOD FOR PROCESSING RADIATION DETECTION SIGNAL

TECHNICAL FIELD

The present invention relates to a radiation detector and a radiation inspecting device for non-destructively inspecting the inside of a container, luggage, or the like which cannot be seen from the outside.

BACKGROUND ART

Many detectors using radiation such as X-rays and gamma rays use a scintillator that converts radiation into visible light or ultraviolet-infrared light having longer wavelengths in the signal detecting section. This is a method of indirectly measuring the intensity of radiation incident on a scintillator by converting the intensity of light converted by the scintillator into an electrical signal with a light receiving element such as a photodiode, which is still one of the best methods for measuring the intensity of radiation.

Radiation inspecting devices are widely used in devices that handle low-energy radiation for foreign matter contamination inspection of food, small-size baggage inspection, and medical use for inspecting the human body, as well as high-energy radiation for inspecting large-size objects such as containers and the inside of housings. The design and types of members used for these devices vary depending on the application and the amount of energy.

For example, a low-energy radiation inspecting device used in the medical field is described in the following patent document (see Patent Document 1). This device outputs X-ray projection data in a two-dimensional form and generates a pixel signal with high accuracy for improving a sampling rate and spatial resolution without increasing an exposure dose to a subject.

CITATION LIST

Patent Document

Patent Document 1: International Publication No. WO 2017/183481

DISCLOSURE OF THE INVENTION

Problem to be Solved by the Invention

Meanwhile, in applications for handling high-energy radiation for inspecting large-size objects such as containers, the following problems are faced.

That is, when signals output from the signal detecting section are processed by an integrated circuit, the integrated circuit has a limited capacity of signals that can be input, so that when a high-energy signal exceeding the allowable input charge amount is input to the integrated circuit, the input signal is clipped due to range over, and accurate detection of the radiation cannot be performed.

In the case of internally observing large-size objects such as containers using high-energy radiation, it is necessary to newly develop a dedicated integrated circuit for processing high-energy signals or to configure a complicated circuit by combining a plurality of general-purpose components in order to increase the allowable input charge amount, and thus there is a problem that the manufacturing cost of the inspecting device is inevitably high in any case.

Further, in the inspecting device for containers, the case where the radiation irradiated toward the containers is incident on the detector with high energy, and the case where the radiation passes through an iron plate or the like having a thickness of about several hundred millimeters and is incident on the detector with weak energy intensity, may occur at the same time.

In order to accurately detect the contents of containers, it is necessary to provide a detecting function corresponding to a wide range that can detect both high-energy radiation and low-energy radiation by minimizing the influence of noise as much as possible in accordance with the energy intensity of the radiation.

In view of such problems of the prior art, the present invention has an object to configure a radiation detector suitable for applications handling high-energy radiation, and a detector capable of appropriately and highly accurately detecting radiation even under an environment where radiation of various energy intensities is irradiated.

Means for Solving Problem

The present invention employs a configuration in which a scintillator and a light receiving device such as a photodiode are used in a signal detecting section of a radiation detector as in the conventional case, and a plurality of light receiving devices are arranged in each cell of the scintillator that is divided into a plurality of cells and output signals output from the respective light receiving devices are combined to generate a radiation detection signal of each cell. That is, the present invention employs a configuration in which photoelectric conversion of scintillation light emitted by one cell is dividedly performed by a plurality of light receiving devices to reduce a charge amount of the output signal of each light receiving device, and the output signals are input into an integrated circuit to generate a radiation detection signal of each cell.

In other words, the radiation detector of the present invention comprises: a signal detecting section including a scintillator constituted of a plurality of cells and a photoelectric conversion unit constituted of a plurality of light receiving devices that receive scintillation light, convert it into analog signals, and output the analog signals; a signal converting section including signal amplification devices that amplify the analog signals output from the respective light receiving devices of the photoelectric conversion unit, and A/D conversion devices that convert the analog signals output from the signal amplification devices into digital signals and output the digital signals; and an image data generating section that generates a radiation detection signal received by the light receiving devices from the digital signals output by the A/D conversion devices and generates radiation image data from the radiation detection signal, wherein the plurality of light receiving devices of the photoelectric conversion unit are arranged along one cell of the scintillator.

In accordance with the radiation detector having the above configuration, each cell of the scintillator emits scintillation light by irradiating the scintillator of the signal detecting section with radiation transmitted through an inspection object, the plurality of light receiving devices of the photoelectric conversion unit of each cell receive the scintillation light and convert it into analog signals, the converted analog signals are amplified by the signal converting section and converted into digital signals by the A/D conversion devices, the converted digital signals of the photoelectric conversion unit are combined in the image data generating section to generate a radiation detection signal of each cell, and radiation image data of the inspection object is generated from the radiation detection signal of each cell.

Each cell of the scintillator is provided with the photoelectric conversion unit constituted of a plurality of light receiving devices, and the photoelectric conversion of the scintillation light is dividedly performed by the plurality of light receiving devices, so that the level of the output signal of each light receiving device can be suppressed to a low level without exceeding the allowable input charge amount of the signal converting section even when high energy scintillation light is photoelectrically converted. Accordingly, even when configuring an inspecting device for applications handling high-energy radiation by using a general-purpose integrated circuit having a low allowable input charge amount, the input signal may not be clipped due to range over.

Further, the output signals of the light receiving devices in the photoelectric conversion unit provided in each cell are respectively input to the signal amplification devices in the signal converting section and amplified, and the amplified signals are respectively input to the A/D conversion devices and converted into digital signals. That is, the signal converting section includes a number of signal amplification devices and A/D conversion devices corresponding to the number (channels) of analog signals input from the signal detecting section, and is provided for individually amplifying the input analog signals and converting the amplified analog signals into digital signals. Thereby, compared to a system of converting a plurality of analog signals into digital signals by a multiplexer method using one A/D conversion device, the signal processing speed is faster and the area of the analog wiring part is smaller, so that the influence of the deterioration of the signals due to noise is hardly affected to improve radiation detection accuracy.

The image data generating section in the radiation detector can be configured to include a signal selecting section that selects a signal having a predetermined level from the output signals of the plurality of light receiving devices converted into the digital signals as a radiation detection signal, and a signal generating section that generates one radiation detection signal from one signal selected by the signal selecting section or by combining a plurality of selected signals.

Thus, in the signal selecting section of the image data generating section, a signal having a predetermined level is selected from the signals input from the plurality of light receiving devices as a radiation detection signal. That is, by selecting a signal having a predetermined level in the signal selecting section, only an appropriate radiation detection signal of each cell can be obtained.

Further, in the signal generating section of the image data generating section, a plurality of signals selected by the signal selecting section are averaged and combined into one radiation detection signal. Thus, in the signal selecting section, signals each having a predetermined level are selected from the signals input from the plurality of light receiving devices as radiation detection signals, and in the signal generating section, the plurality of selected signals are averaged and combined into a radiation detection signal of each cell. By recombining the divided photoelectric conversion signals of the scintillation light by the signal generating section, noise contained in the signals is reduced, and a highly accurate detection signal can be obtained. Note that when only a single signal is selected, the signal is generated as a radiation detection signal as it is.

The signal generating section of the image data generating section can be configured to have a function of weighting signals according to arrangement positions of the light receiving devices and performing combining processing.

Thereby, when a deterioration of the image signal quality occurs due to the influence of crosstalk, an appropriate radiation detection signal with a reduced crosstalk component can be obtained depending on the arrangement of the plurality of light receiving devices of each cell.

In the radiation detector having the above configuration, the photoelectric conversion unit can be constituted of a plurality of light receiving devices having different light receiving sizes.

Thereby, a plurality of light receiving devices having different light receiving sizes are arranged in one cell, the output signals of the respective light receiving devices are converted into digital signals, signals each having a predetermined level are then selected from the output signals of the light receiving devices having different light receiving sizes in the signal selecting section of the image data generating section, and the selected signals are combined to generate one radiation detection signal in the signal generating section, so that the dynamic range of the radiation detection signal can be expanded.

In addition, the radiation detector can be configured to include a signal sorting section that sorts arbitrary light receiving devices from the plurality of light receiving devices in one cell and inputs the output signals of the sorted light receiving devices as radiation detection signals to the signal amplification devices of the signal converting section.

For example, a signal sorting section can be provided in such a manner that signal output sections of some light receiving devices among a plurality of light receiving devices are connected in parallel, one light receiving device and the plurality of light receiving devices connected in parallel are sorted, the respective output signals are converted into digital signals, and the digital signals are then selected and combined in the image data generating section. By providing a signal sorting section so as to sort the light receiving devices that convert into a digital signal as described above, the dynamic range of the radiation detection signal can also be expanded.

The radiation inspecting device of the present invention is configured to include at least a radiation detector having the above configuration, a radiation source that irradiates an inspection object with radiation, and a terminal device including a display device such as a monitor that outputs and displays radiation image data output from the radiation detector.

The signal detecting section, the signal converting section, the image data generating section, and optionally the signal sorting section of the radiation detector can be respectively modularized and configured by integrated circuits equipped with respective signal processing functions.

As described above, the signal processing speed can be increased when the signal converting section includes a number of signal amplification devices and A/D conversion devices corresponding to the number of analog signals input from the signal detecting unit, and individually amplifies the input analog signals and converts them into digital signals. However, if the number of input channels of the analog signals is large and the number of A/D conversion devices corresponding to the number of channels is prepared, the circuit configuration becomes large accordingly.

On the other hand, in the case of a device configuration that requires miniaturization of the circuit, the analog signals may be converted into digital signals by a multiplexer method by the following configuration: the signal converting section is constituted of a number of signal amplification devices corresponding to the number of input channels of the analog signals, an analog switch that selects signals from the output signals of the respective signal amplification devices, and A/D conversion devices that convert the signals output from the analog switch into digital signals, which are constituted of fewer channels than the number of analog signal channels (for example, one A/D conversion device may be adopted), depending on objects to be inspected by irradiating with radiation or the detection accuracy required for the radiation detector.

Conventionally, in accordance with the magnitude of the output signal of the light receiving device, it has been necessary to set the allowable input charge amount of the signal amplification device of the signal conversion unit on the next stage. Therefore, it has been necessary to design the electric circuit each time in accordance with the energy band of the radiation to be used and the difference in signal intensity caused by the distance from the radiation source to the radiation detector.

On the other hand, in the present invention, it is possible to handle not only high-energy radiation but also radiation having a wide range of energy intensities. Accordingly, with one standardized radiation detector, it is possible to realize highly accurate radiation inspection by flexibly handling the differences in the size of the object to be inspected with radiation, the condition for performing the inspection, and the environment.

The present invention can be applied to various inspecting devices that irradiate an inspection object with radiation, detect the transmitted radiation, and generate an image, such as X-ray detecting devices including X-ray transmission image processing devices and back-scattered X-ray image processing devices, inspecting devices using gamma rays, and ultraviolet image processing devices.

BRIEF DESCRIPTION OF DRAWINGS

FIG. 1 is a diagram illustrating a configuration of an example of a radiation inspecting device of the present invention.

FIG. 2 is a circuit configuration diagram of a first embodiment of a radiation detector of the present invention.

FIG. 3 is a circuit configuration diagram of a second embodiment of a radiation detector of the present invention.

FIG. 4 is a circuit configuration diagram of a third embodiment of a radiation detector of the present invention.

FIG. 5 is a circuit configuration diagram of a fourth embodiment of a radiation detector of the present invention.

FIG. 6 is a circuit configuration diagram of a fifth embodiment of a radiation detector of the present invention.

MODE(S) FOR CARRYING OUT THE INVENTION

Hereinafter, preferred embodiments of the radiation detector and the radiation inspecting device of the present invention will be described.

The technical idea of the present invention is not limited to the embodiments.

FIG. 1 shows a configuration of an example of the radiation inspecting device of the present invention.

As shown in the figure, a radiation inspecting device 1 includes a radiation detector 2, a radiation source 3, and a host computer 4 as main components; and is configured in such a manner that an inspection object 5 conveyed by a conveying mechanism (not shown) is irradiated with radiation from the radiation source 3, the radiation transmitted through the inspection object 5 is detected by the radiation detector 2 to generate radiation image data from the radiation detection signals, the data is transmitted to the host computer 4 serving as a terminal device to generate a two-dimensional radiation image data file of the inspection object 5, and the radiation image data is output and displayed on the monitor serving as a display device. The radiation inspecting device 1 may be configured in such a manner that the radiation detector 2 and the radiation source 3 move in parallel along the fixed inspection object 5, and the irradiation of radiation to the inspection object 5 and its detection are performed while moving.

The radiation detector 2 is configured to include a signal detecting section 21 that detects radiation, converts it into analog signals, and outputs the analog signals, a signal converting section 22 that amplifies the analog signals, and then converts them into digital signals and outputs the digital signals, and an image data generating section 23 that generates radiation image data from the digital signals input from the signal converting section 22.

Hereinafter, the configuration of the radiation detector 2 will be described based on the embodiments.

FIG. 2 shows a first embodiment of the radiation detector 2.

The signal detecting section 21 of the shown radiation detector 2 is constituted of a scintillator 210 that is divided into a plurality of cells 211 and converts incident radiation into scintillation light, and a photoelectric conversion unit 212 comprising two light receiving devices 212a and 212b, which are photodiodes arranged in each cell 211 of the scintillator 210 and receiving the scintillation light emitted from one cell 211 to convert and output the scintillation light into analog signals.

The photoelectric conversion unit 212 comprising two light receiving devices 212a and 212b is respectively arranged in each cell 211, and the photoelectric conversion of the scintillation light of each cell 211 is dividedly performed by the two light receiving devices 212a and 212b. Note that in the scintillator 210, adjacent cells 211 are partitioned by optically separating separators.

The signal converting section 22 is constituted of signal amplification devices 221 that amplify the analog signals output from the respective light receiving devices 212a and 212b of the photoelectric conversion unit 212 of each cell 211, and A/D conversion devices 222 that convert the amplified analog signals output from the signal amplification devices 221 into digital signals and output the digital signals.

The analog signals output from the light receiving devices 212a and 212b are individually amplified by the respective signal amplification devices 221, and individually converted into digital signals by the respective A/D conversion devices 222.

The image data generating section 23 includes a signal selecting section that selects one or a plurality of signals having a predetermined level from the output signals of the respective light receiving devices 212a and 212b as radiation detection signals of one cell 211, and a signal generating section that averages the output signals of the respective light receiving devices 212a and 212b selected by the signal selecting section and combines them into a radiation detection signal of one cell 211; and is configured to generate a radiation detection signal of one cell 211 by both processing sections and to generate radiation image data from the generated radiation detection signal of each cell 211.

Here, although FIG. 2 shows the embodiment in which the scintillator 210 is divided into four cells 211 to generate a radiation detection signal of each cell 211, each cell 211 of the scintillator 210 is actually arranged in series (for example, 32 cells), and radiation image data is generated from the radiation detection signals of these many cells 211.

The signal detecting section 21 can use a detector board constituted by mounting sixty-four scintillator arrays (scintillator 210), each of which is separated into, for example, thirty-two cells 211, on PIN photodiodes (light receiving devices 212) at half intervals. A scintillator array separated into sixteen cells 211 may be used. The signal converting section 22 can be constituted of an integrated circuit having input parts of 64 channels, in which case the output of each photodiode (light receiving device 212) of the detector board is connected to each channel, and the signal is amplified and converted into a digital signal for each channel.

In the radiation detector 2 configured as described above, each cell 211 of the scintillator 210 emits scintillation light by irradiating the scintillator 210 of the signal detecting section 21 with radiation transmitted through the inspection object 5, the light receiving devices 212a and 212b of the photoelectric conversion unit 212 arranged along each cell 211 receive the scintillation light and convert it into analog signals, the converted analog signals are respectively amplified by the signal amplification devices 221 of the signal converting section 22 and converted into digital signals by the A/D conversion devices 222, the digital signals are input to the image data generating section 23, and the digital signals input in the signal generation section of the image data generating section 23 are respectively averaged and combined as a radiation detection signal of each cell 211.

Then, radiation image data of the inspection object 5 is generated from the generated radiation detection signal of each cell 211, and the radiation image data is transmitted to the host computer 4 to generate a two-dimensional radiation image data file of the inspection object 5, and thus the radiation image data can be output and displayed on the monitor of the host computer 4.

Accordingly, each cell 211 of the scintillator 210 is provided with the photoelectric conversion unit 212 constituted of a plurality of light receiving devices 212a and 212b, and the photoelectric conversion of the scintillation light is dividedly performed by the plurality of light receiving devices 212a and 212b, so that the level of the output signal of each light receiving device can be suppressed to a low level without exceeding the allowable input charge amount of the signal converting section 22 even when high energy scintillation light is photoelectrically converted. Also, by recombining the divided photoelectric conversion signals of the scintillation light by the signal generating section of the image data generating section 23, noise contained in the signals is reduced, and highly accurate detection signals can be obtained.

Further, the signal converting section 22 is provided for individually amplifying the analog signals and converting the amplified analog signals into digital signals by the signal amplification devices 221 and the A/D conversion devices 222, so that the influence of the deterioration of the signals due to noise is hardly affected, and good signal detection sensitivity can be obtained.

FIG. 3 shows a second embodiment of the radiation detector 2.

In this embodiment, the photoelectric conversion unit 212 arranged in each cell 211 of the scintillator 210 of the signal detecting section 21 is constituted of two light receiving devices 212a and 212b having different light receiving sizes, the photoelectric conversion of the scintillation light is dividedly performed by the two light receiving devices 212a and 212b having different light receiving sizes, the respective photoelectrically converted analog signals are input to the signal converting unit 22 and amplified, and then the amplified analog signals are converted into digital signals and input to the image data generating section 23.

In the radiation detector 2 configured as described above, the signal selecting section in the image data generating section 23 selects a signal having a predetermined level from the plurality of digital signals input from the signal converting section 22 as the radiation detection signal of each cell 211, and the radiation image data of the inspection object 5 is generated from the selected radiation detection signal of each cell 211.

As described above, the photoelectric conversion of the scintillation light is dividedly performed by the light receiving devices 212a and 212b having different light receiving sizes, and the respective detection signals are selected to generate a radiation detection signal, so that the dynamic range of the radiation detection signal can be expanded. For example, when the energy of the scintillation light is high, the detection signal of the light receiving device 212a having a small light receiving size is selected, and when the energy thereof is low, the detection signal of the light receiving device 212b having a large light receiving size is selected to generate a radiation detection signal, thereby corresponding to the detection of the wide range radiation.

In this case, the range switching can be automatically performed, for example, by providing the signal converting section 22 with a means for determining whether or not the output signals of the light receiving devices 212a and 212b to be input to the signal amplification devices 221 overflow. The gain setting can be provided so as to be performed for each cell 211.

FIG. 4 shows a third embodiment of the radiation detector 2.

In this embodiment, the photoelectric conversion unit 212 arranged in each cell 211 of the scintillator 210 of the signal detecting section 21 is constituted of nine light receiving devices 212a having the same light receiving size, and a signal sorting section 24 is provided in the signal output section of each light receiving device 212a. Of the nine light receiving devices 212a, one light receiving device 212a is provided in such a manner that the output signal is input to the signal amplification device 221 of the signal converting section 22. The other light receiving devices 212a are provided in such a manner that the signal output sections are connected in parallel, and the total amount of the output signals of the light receiving devices 212a sorted by the signal sorting section 24 is input to the signal amplification device 221 of the signal converting section 22. The signal sorting section 24 can be configured by a switching means such as a wire bonding technique or a switching element.

In the radiation detector 2 configured as described above, the detection signal of the one light receiving device 212a and the detection signals of the plurality of sorted light receiving devices 212a are converted into digital signals and input to the image data generating section 23, the signal selecting section in the image data generating section 23 selects a signal having a predetermined level from the input digital signals as the radiation detection signal of each cell 211, and the radiation image data of the inspection object 5 is generated from the selected radiation detection signal of each cell 211.

As described above, the photoelectric conversion of the scintillation light is dividedly performed by the plurality of light receiving devices 212a, the respective detection signals are sorted into one detection signal and a plurality of detection signals, and an appropriate level signal is selected from the detection signals to generate a radiation detection signal, so that the dynamic range of the radiation detection signal can be expanded in the same manner as when the light receiving devices 212a and 212b having different light receiving sizes are arranged. Further, the size ratio of the light receiving devices 212a can be freely set and changed by the connection combination of the light receiving devices 212a in the signal sorting section 24. Although the photoelectric conversion unit 212 is configured by nine light receiving devices 212a having the same light receiving size in FIG. 4, the number of light receiving devices 212a may be increased or decreased from nine. Also, the combination of the number of light receiving devices 212a to be sorted by the signal sorting section 24 can be appropriately set. Although the light receiving devices 212a are sorted to a combination of one and eight in FIG. 4, these may be sorted to, for example, a combination of two and seven, three and six, or four and five. The light receiving devices 212a of each sorted combination may be connected in parallel, and the total amount of the output signals of the light receiving devices 212a of each combination may be respectively input to the signal amplification devices 221 of the signal converting section 22.

FIG. 5 shows a fourth embodiment of the radiation detector 2.

In this embodiment, the photoelectric conversion unit 212 arranged in each cell 211 of the scintillator 210 of the signal detecting section 21 is constituted of three light receiving devices 212a, 212b, and 212c; the respective detection signals are amplified by the signal converting section 22, converted into digital signals, and input to the image data generation section 23; and the signal generating section of the image data generating section 23 is configured to weight the detection signals of the respective light receiving devices 212a, 212b, and 212c converted into digital signals according to the arrangement positions of the light receiving devices 212a, 212b, and 212c, and to combine these signals.

In the prior art, crosstalk may occur in the output signals of the light receiving devices 212a due to the influence of light leakage from the adjacent cells 211 of the scintillator 210 and leakage current from the adjacent light receiving devices 212a, and crosstalk correction at the system level may be required.

In this embodiment, as to the three light receiving devices 212a, 212b, and 212c of each cell 211, by weighting and combining the outputs of the light receiving devices 212a and 212c at both ends and the light receiving device 212b at the center, the crosstalk component from cells 211 adjacent to the relevant cell 211 can be reduced. By disregarding the signal in the vicinity of the adjacent portion, the influence of crosstalk can be minimized, the correction at the system level can be reduced, and the correction processing itself can also be eliminated.

FIG. 6 shows a fifth embodiment of the radiation detector 2.

Instead of the signal converting section 22 having the same number of signal amplification devices 221 and A/D conversion devices 222 as the number of analog signals input from the signal detecting section 21 of each embodiment, the signal converting section 22 in this embodiment is configured to include the same number of signal amplification devices 221 as the number of input channels of the analog signals, a plurality of input terminals, an analog switch 223 that selects a signal from the output signals of the respective signal amplification devices 221, and one A/D conversion device 222 that converts the output signal of the analog switch 223 into digital signals.

In the radiation detector 2 configured as described above, the scintillation light emitted by each cell 211 of the scintillator 210 of the signal detecting section 21 in response to the irradiation of radiation is dividedly received by the plurality of light receiving devices 212a and 212b of the photoelectric conversion unit 212 of each cell 211, the light receiving devices 212a and 212b photoelectrically convert the scintillation light and output analog signals, and the converted analog signals are individually amplified by the signal amplification devices 221 of the signal converting section 22. The signal output terminals of the respective signal amplification devices 221 are respectively connected to a plurality of input terminals of the analog switch 223, the analog switch 223 selects and switches the input terminals at a predetermined timing, the analog signal output from the selected signal amplification device 221 is input to the A/D conversion device 222 and converted into digital signals, and the digital signals are sequentially input to the image data generating section 23. Then, the image data generating section 23 edits and combines the sequentially input digital signals in time series to generate a radiation detection signal of each cell 211, and radiation image data is generated from the generated radiation detection signals.

In this embodiment, the analog signals output from the plurality of signal amplification devices 221 are converted into digital signals by the analog switch 223 and the A/D conversion device 222, and the converted signals are combined to generate the radiation detection signal in the image data generating section 23, so that it is not necessary to arrange the number of A/D conversion devices 222 corresponding to the number of the signal amplification devices 221, which is extremely effective in realizing miniaturization of the circuit when the signal converting section 22 is constituted of an integrated circuit.

Here, when the image data generating section 23 is constituted of an integrated circuit such as FPGA, the signal combining processing and the signal selecting processing by the signal selecting section and the signal generating section in the image data generating section 23 are automatically performed by appropriately setting the signal combining method and the reference value for selecting the signal depending on the use mode or the like of the radiation inspecting device 1. The sorting reference value of the signal sorting section 24 can also be appropriately set such that the sorting is automatically performed. Alternatively, the signal combining, selecting, and sorting processes may be controlled in such a manner that, in a state where the radiation detector 2 is connected to the host computer 4 and the radiation detection data can be monitored by the host computer 4, the conditions for signal combining, selecting, and sorting are set on the host computer 4, and the set values are input to the radiation detector 2.

The forms of the shown radiation inspecting device 1 and the radiation detector 2 of each embodiment are examples, and the present invention is not limited to the exemplary embodiments and may be any other suitable form.

EXPLANATIONS OF LETTERS OR NUMERALS

1 Radiation inspecting device
2 Radiation detector

21 Signal detecting section
210 Scintillator
211 Cell
212 Photoelectric conversion unit
212a, 212b, and 212c Light receiving devices
22 Signal converting section
221 Signal amplification device
222 A/D conversion device
223 Analog switch
23 Image data generating section
24 Signal sorting section
3 Radiation source
4 Host computer
5 Inspection object

The invention claimed is:

1. A radiation detector, comprising:
a signal detecting section including a scintillator constituted of a plurality of cells and a photoelectric conversion unit constituted of a plurality of light receiving devices that receive scintillation light, convert it into analog signals, and output the analog signals;
a signal converting section including signal amplification devices that amplify the analog signals output from the respective light receiving devices of the photoelectric conversion unit, and A/D conversion devices that convert the analog signals output from the signal amplification devices into digital signals and output the digital signals; and
an image data generating section that generates a radiation detection signal received by the light receiving devices from the digital signals output by the A/D conversion devices and generates radiation image data from the radiation detection signal,
wherein the plurality of light receiving devices of the photoelectric conversion unit are arranged along one cell of the scintillator, and
the image data generating section includes a signal selecting section that selects a signal having a predetermined level from the output signals of the plurality of light receiving devices converted into the digital signals as a radiation detection signal, and a signal generating section that generates one radiation detection signal from one signal selected by the signal selecting section or by combining a plurality of selected signals.

2. The radiation detector according to claim 1, wherein the signal generating section has a function of averaging a plurality of signals selected by the signal selecting section and combining them into one radiation detection signal.

3. The radiation detector according to claim 1, wherein the signal generating section of the image data generating section weights detection signals according to arrangement positions of the light receiving devices.

4. The radiation detector according to claim 1, wherein the photoelectric conversion unit is constituted of a plurality of light receiving devices having different light receiving sizes.

5. The radiation detector according to claim 1, comprising a signal sorting section that sorts arbitrary light receiving devices from the plurality of light receiving devices and inputs signals output from the sorted light receiving devices to the signal amplification devices of the signal converting section as radiation detection signals.

6. A radiation inspecting device, comprising
the radiation detector according to claim 1,
a radiation source that irradiates an inspection object with radiation, and
a terminal device including a display device that outputs and displays radiation image data output from the radiation detector.

7. A method for processing a radiation detection signal,
wherein in the method for processing a radiation detection signal using a radiation detector,
the radiation detector comprises:
a signal detecting section including a scintillator constituted of a plurality of cells and a photoelectric conversion unit constituted of a plurality of light receiving devices arranged in each cell of the scintillator;
a signal converting section including signal amplification devices and A/D conversion devices; and
an image data generating section that processes signals output from the A/D conversion devices to generate a radiation detection signal and radiation image data, and
wherein the method includes:
a process in which the plurality of light receiving devices arranged along each cell photoelectrically convert scintillation light emitted by each cell of the scintillator when the scintillator of the signal detecting section is irradiated with radiation to output analog signals;
a process of amplifying the analog signals output from the plurality of light receiving devices in each cell by the signal amplification devices of the signal converting section, converting them into digital signals by the A/D conversion devices, and inputting them to the image data generating section;
a process of selecting a signal having a predetermined level from the output signals of the plurality of light receiving devices converted into the digital signals in the image data generating section; and
a process of generating one radiation detection signal from the selected signal when the signal is one, or by combining the plurality of selected signals when there are multiple signals.

* * * * *